United States Patent
Bonhomme et al.

[11] Patent Number: 5,943,420
[45] Date of Patent: Aug. 24, 1999

[54] POWER-UP SYSTEM FOR LINE-POWERED TELEPHONES

[75] Inventors: Frederick Joseph Bonhomme, Greenfield; Roger Edward Holtz, Indianapolis, both of Ind.

[73] Assignee: Lucent Technologies, Inc., Holmdel, N.J.

[21] Appl. No.: 08/727,893

[22] Filed: Oct. 9, 1996

[51] Int. Cl.$^6$ .................................................. H04M 1/00
[52] U.S. Cl. ........................ 379/399; 379/420; 379/388; 455/569; 455/557
[58] Field of Search .................................. 379/399, 420, 379/35, 102.01, 120.02, 388; 455/569, 557

[56] References Cited

U.S. PATENT DOCUMENTS

| | | |
|---|---|---|
| 3,026,383 | 3/1962 | Englander . |
| 3,872,262 | 3/1975 | Kerman . |
| 4,025,728 | 5/1977 | Jacobson . |
| 4,101,735 | 7/1978 | Bridenbaugh . |
| 4,237,344 | 12/1980 | Moore . |
| 4,277,647 | 7/1981 | Brolin et al. ............................ 379/146 |
| 5,561,712 | 10/1996 | Nishihara ................................ 379/355 |
| 5,636,273 | 6/1997 | Schopfer et al. ....................... 379/412 |

*Primary Examiner*—N. Le
*Assistant Examiner*—Shih-Wen Hsieh
*Attorney, Agent, or Firm*—Gregory A. Welte

[57] ABSTRACT

A speaker-phone telephone, in which a speaker-microphone unit is powered by wall current, and a separate telephone is separately powered, by telephone line current. The speaker-microphone unit contains a switch by which a user can call for a speaker-phone call. The switch initiates a signal, which is held in existence, until a microprocessor detects the signal, and removes it.

7 Claims, 5 Drawing Sheets

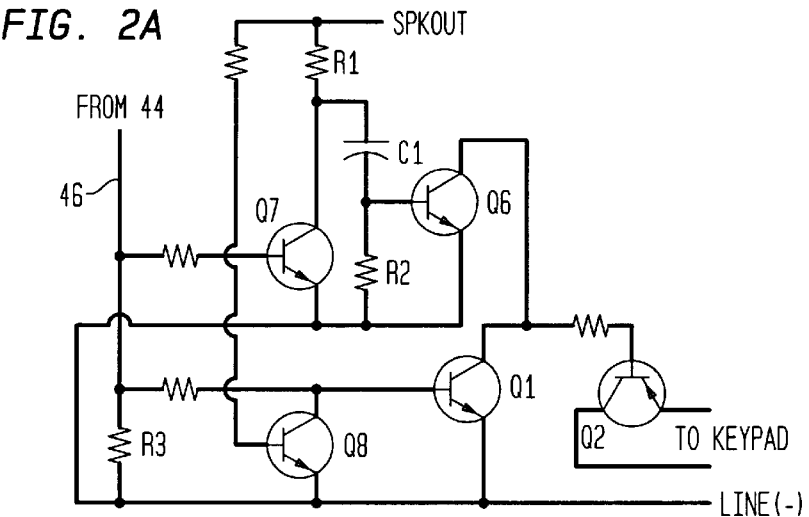
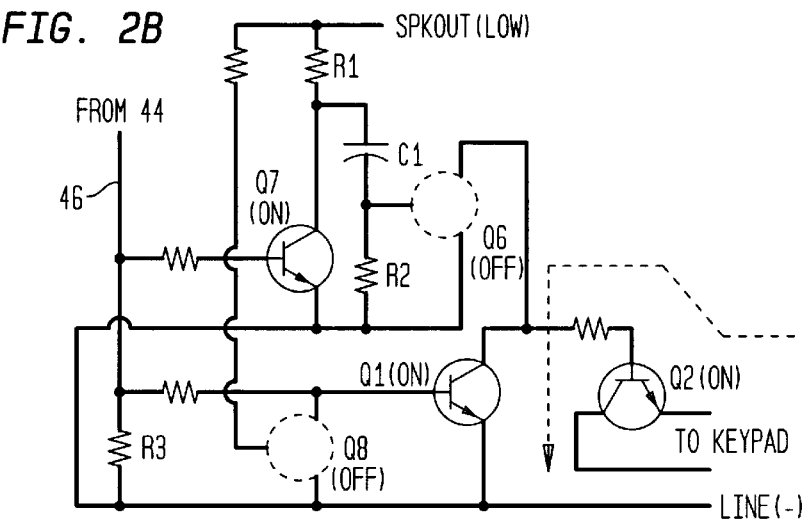
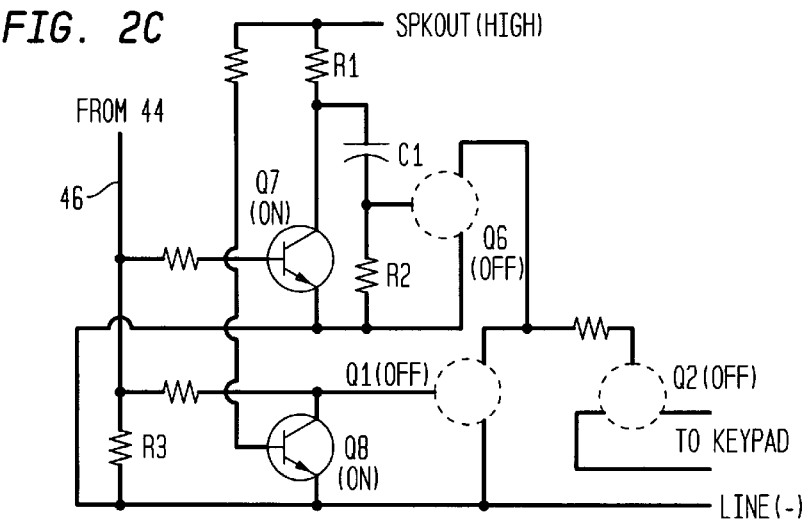

POWER-UP SYSTEM FOR LINE-POWERED TELEPHONES

The invention concerns a system for actuating speaker telephones of the type which (a) derive power from the telephone line during operation and (b) draw no power from the telephone line when not in use.

BACKGROUND OF THE INVENTION

Many modern telephones are controlled by microprocessors. Some types of microprocessors can be designed to consume very little power, and thereby enable telephones to obtain their operating power from the telephone line itself, rather than from an electrical outlet. Such telephones are called "line-powered" telephones.

Line-powered telephones can be divided into two classes, based on their power consumption when inactive. The first class includes those which draw a small current from the telephone line, called a leakage current. This current is not sufficient to power all features of the telephone, but is sufficient to maintain the microprocessor in an alert state.

The alert microprocessor monitors the keypad of the telephone. When key presses are detected, the microprocessor infers that a telephone call is impending, and connects the telephone to the telephone line, to supply full power. The telephone becomes active.

The second class includes telephones which draw no power at all from the telephone line when inactive. In this class of telephones, unlike the first class, key presses are not detected when the telephone is inactive, because the microprocessor is unpowered at that time. To allow detection of key presses when the telephone is inactive, such a telephone may be equipped with a storage battery may supply power. However, maintaining such a battery is seen as complex and expensive.

SUMMARY OF THE INVENTION

The afore-mentioned deficiencies are addressed, and an advance is made in the art, wherein apparatus within a line-powered telephone responds to an actuation signal from a remote speakerphone unit. In responding to the actuation signal, the telephone configures itself to (1) connect with a power-carrying telephone line and (2) issue an internal speakerphone signal requesting speakerphone operation. A microprocessor within the telephone detects the speakerphone signal, and causes the telephone to enter speakerphone mode of operation. The speakerphone unit is powered by wall current, which is subject to lightening strikes. Nevertheless, the speakerphone unit is able to deliver the actuation signal to the telephone, while maintaining electrical isolation sufficient to withstand a potential difference of 1,000 volts between itself and the telephone.

BRIEF DESCRIPTION OF THE DRAWINGS

FIGS. 2A–2E illustrate a sequence of logic states undergone by the circuit 49 in FIG. 1.

DETAILED DESCRIPTION OF THE INVENTION

Power-up of Microprocessor

Figure 1:
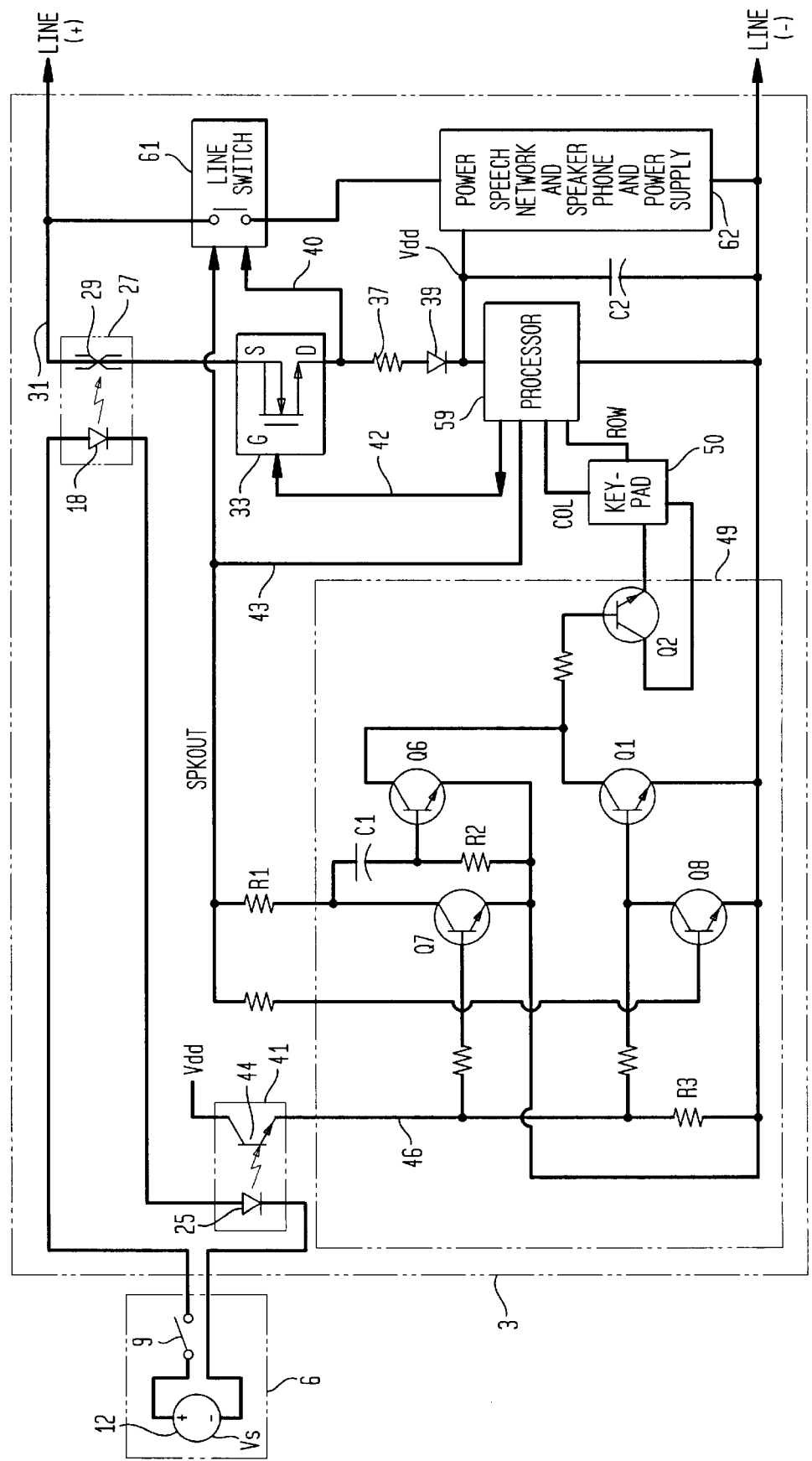
FIG. 1 illustrates apparatus used by one form of the invention.

FIG. 1 illustrates circuitry 3, contained within a telephone set, and also a remote unit 6. The remote unit 6 represents a speaker-microphone combination, used to make conference calls.

The remote unit 6 is a powered device: it receives operating power from a household 120-volt wall outlet, through an internal power supply (not shown). Voltage source 12, labeled Vs, represents the internal power supply of the remote unit 6.

In contrast, the circuitry 3, located within the telephone itself, receives operating power from the telephone lines, labeled LINE(+) and LINE(−). The circuitry 3 is non-powered at this time, because line switch 61 and FET 33 are open, thereby breaking connection with LINE(+).

When a user wishes to place a speakerphone call, the user closes switch 9 in the remote unit 6, which calls for the telephone to go "off-hook." This closure, which is maintained throughout the telephone call, is termed herein an "actuation signal." It drives a current through Light-Emitting Diodes (LEDs) 18 and 25.

LED 18 is part of a solid-state relay 27. When LED 18 becomes illuminated, relay section 29 closes, thereby connecting LINE(+), which is commonly called a "tip" line (as opposed to the "ring" line), to the source S of a Field-Effect Transistor (FET) 33. The FET 33 is biased to be in a conductive state when, as occurs now, power is applied to its source S, unless a signal on line 42 turns the FET off, which does not occur at present.

Because the FET 33 is now conducting, its drain D is now pulled to a high voltage. The FET 33 then delivers power to the microprocessor 59, through resistor 37 and diode 39. The high drain D also feeds a signal, on line 40, to a line switch 61, thereby causing the line switch 61 to close. The line switch 61 takes the form of an FET controlled by internal logic circuitry receiving inputs on lines 40 and 43. Either line, independent of the other, is effective to turn ON the FET.

This closure of the line switch 61 delivers power to network 62, which contains (1) the speech network of the telephone, (2) speakerphone circuitry, and (3) a power supply, as indicated. At this time, the telephone becomes fully powered.

Upon application of power through diode 39 to the microprocessor 59, the microprocessor runs through its normal power-up routine. Then, the microprocessor receives inputs via keypad 50, in a process described below wherein transistor Q2 closes, which causes the microprocessor to enter the speakerphone mode of operation. The microprocessor then issues a SPKOUT signal, on line 43, which will hold the line switch 61 in the closed state, independent of the signal applied on line 40. In addition, the microprocessor turns FET 33 OFF, by applying a signal to line 42. Now, the microprocessor receives power exclusively through line 41, from block 62. Block 62 contains a power supply (not shown) which is energized by line switch 61. This power supply now powers the microprocessor.

The preceding discussion may be summarized by the following sequence of events:

1. Solid-state relay 27 closes, feeding current through FET 33.
2. The current through FET 33 powers the microprocessor 59, through diode 39, and this current also closes line switch 61, by the signal on line 40.
3. When line switch 61 closes, the power supply in block 62 becomes energized, and supplies power to the microprocessor, on line 41.
4. When the microprocessor receives power on line 41, it turns off FET 33, thereby eliminating FET 33 as a source of power.

Keypad Input

Along with the events described above, and before the microprocessor enters the speakerphone state, LED 25 has been passing current. The light it produces is received by a phototransistor 44. The light causes the transistor to become conductive, pulling line 46 high, thereby turning on transistors Q1 and Q7 within the circuit enclosed in dashed box 49.

FIG. 2 illustrates a sequence of states through which circuit 49 cycles. FIG. 2A is a copy of the circuit contained within dashed block 49 in FIG. 1, and is given for reference. The HIGH signal, on line 46, drives transistors Q1 and Q7 into conduction, as indicated in FIG. 2B. The other transistors, Q6 and Q8, are turned OFF, as indicated by being drawn in phantom.

In FIG. 2B, transistor Q7 has a positive base-to-emitter voltage which is sufficient to turn it ON. However, its collector is connected through resistor R1 to the line labeled SPKOUT. (It was stated above that the microprocessor issued the SPKOUT signal on line 43, to close switch 61. FIG. 2B illustrates the situation prior to this event.) Thus, only base current, and no collector current, flows through Q7.

Nevertheless, because of the base current applied by line 46, transistor Q7 will prevent its collector from rising above its saturation value, should line SPKOUT rise in voltage. Therefore, Q7 is treated as being ON at present, in the sense that current will flow through it, when voltage is applied to resistor R1 from the line SPKOUT.

Figure 3B:
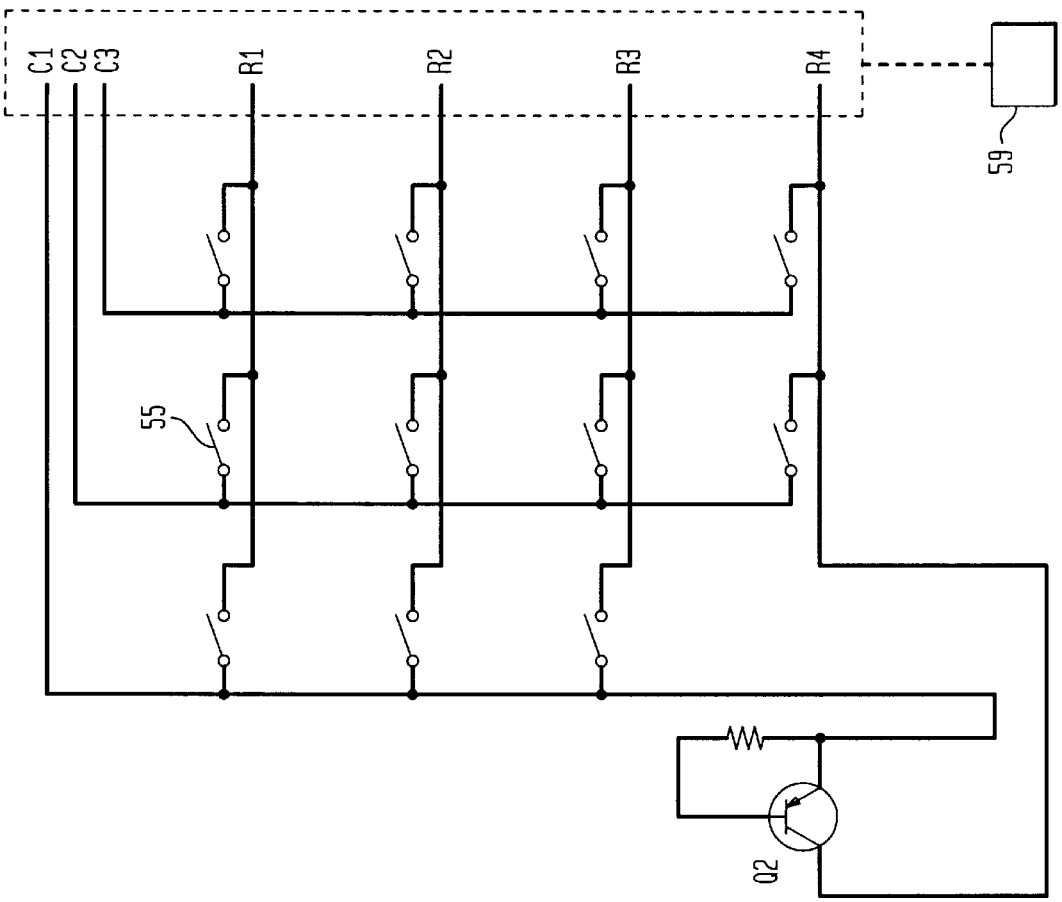
FIG. 3B illustrates replacement of a switch in the matrix by transistor Q2.
Figure 3A:
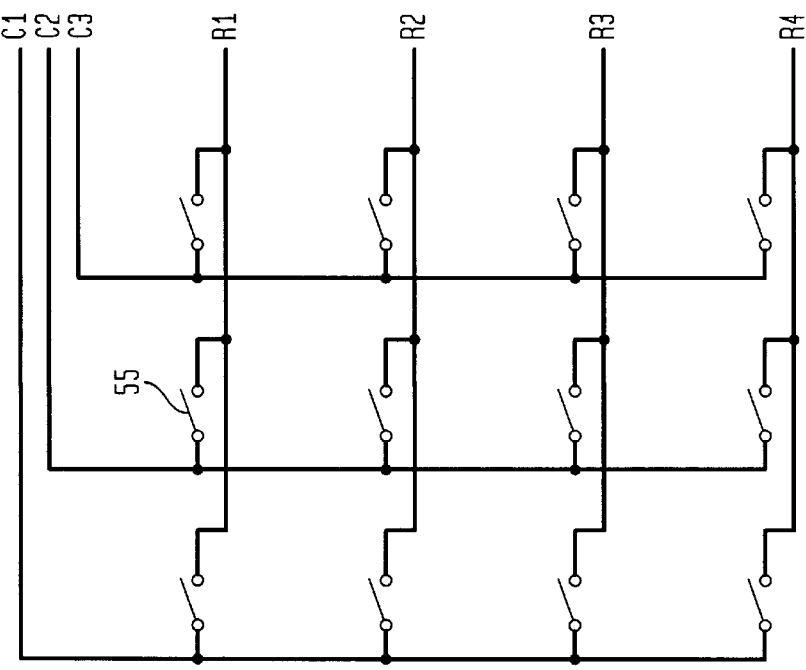
FIG. 3A illustrates a keypad matrix.

Transistor Q2 is connected into a keypad matrix 50, a representative of which is shown in FIG. 3A. The microprocessor (not shown) monitors column lines C1, C2, and C3 (labeled as "COL" in FIG. 1) and row lines R1–R4 (labeled as "ROW" in FIG. 1). When the microprocessor detects that a row is shorted to a column, the microprocessor infers that the switch connecting the row to the column has closed.

For example, a closure of switch 55 in FIG. 3A connects row R1 to column C2. The lines R1 and C2 appear to be shorted together, indicating the closure. All other line combinations appear as open circuits, indicating open switches.

Figure 2D:
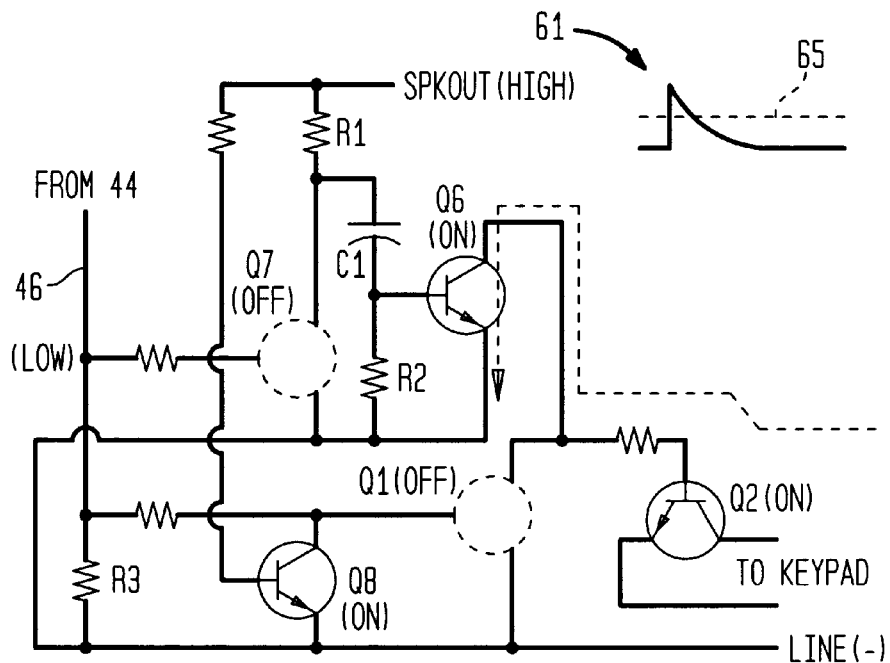

Transistor Q2 replaces one of the switches, as indicated in FIG. 3B. When transistor Q2 conducts, it somewhat resembles a short circuit, and row R4 and column C1 appear shorted together. The turn-on of transistor Q1 allows this conduction, as indicated by the dashed arrow in FIG. 2B. This conduction of transistor Q2 simulates a closure of a keypad switch, connecting column C1 with row R4 in FIG. 3B. Since transistor Q2 simulates operation of a mechanical keypad switch, transistor Q2 will be called a "keypad-switch."

When the microprocessor 59 in FIG. 3B, after running through its power-up routines, detects the keypad switch (ie, transistor Q2) to be closed, by monitoring lines C1–C3 and R1–R4, the microprocessor 59 issues a SPKOUT signal, shown in FIG. 2C, and on line 43 in FIG. 1. The SPKOUT signal is a HIGH signal, as indicated in FIG. 2C. The SPKOUT signal causes the closure of switch 61 in FIG. 1, as discussed above.

This HIGH signal turns ON transistor Q8 in FIG. 2C, thereby pulling LOW the base B of transistor Q1, thereby turning off transistor Q1, as indicated. This action turns off transistor Q2, thereby creating an open circuit between lines C1 and R4 in FIG. 3B, and thus removing the keypad-switch-closure-input to the microprocessor.

This turn-off of transistor Q2 is done for a particular reason: in general, the switches of the keypad shown in FIG. 3B should not be held closed for an extended period of time. Extended switch closure causes problems to the microprocessor 59, the details of which need not be discussed here.

The state shown in FIG. 2C persists during the speakerphone call. When the user finishes the call, the user opens switch 9 in FIG. 1, indicating that the telephone should go "on-hook." This opening terminates current through LEDs 18 and 25. Termination of current through LED 18 causes the solid-state relay 27 to open. (However, at this time, this opening has no effect on FET 33, because FET 33 was previously turned off by the signal on line 42.) Termination of current through LED 25 drives transistor 44 out of conduction, thereby allowing resistor R3 to pull line 46 LOW.

This LOW condition of line 46 is indicated in FIG. 2D. Now, transistors Q1 and Q7 are turned OFF, as indicated. Turning Q7 OFF allows pull-up resistor R1 to pull the base B of transistor Q6 HIGH, thereby turning ON transistor Q6. However, the turn-ON is momentary. As capacitor C1 charges, resistor R2 pulls down the base voltage of Q6. When the base voltage falls below the turn-ON threshold 65, shown in plot 61, transistor Q6 turns OFF.

Plot 61 is an approximate voltage-time plot of the base voltage of Q6. When the voltage is above the threshold 65, the transistor is ON. When the voltage is below the threshold 65, the transistor is OFF.

Figure 2E:
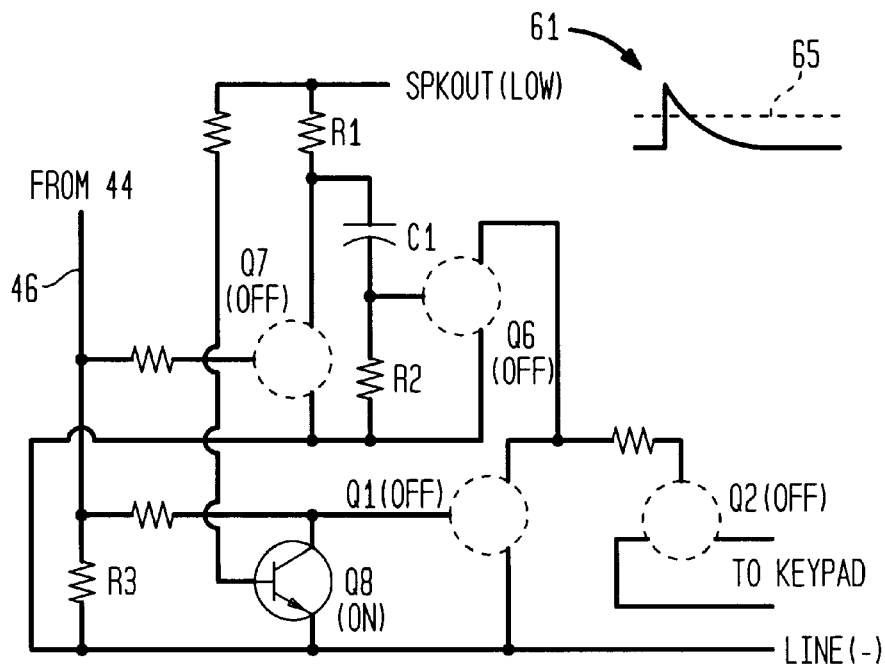

Therefore, the HIGH-LOW transition of line 46, caused by a user's opening of switch 9 in FIG. 1, causes transistor Q2 in FIG. 2D, which mimics a keypad switch, to briefly close, as shown in FIG. 2D, and then open, as in FIG. 2E. This momentary "key press" is detected by the microprocessor 59, which, in response, exits the speakerphone mode and issues signals which are received by other circuitry, such as that in block 62 in FIG. 1.

These signals cause the other circuitry to place the telephone into the "on-hook" state, in which the telephone draws no current from the telephone line. Also, upon exiting the speakerphone mode, the microprocessor pulls SPKOUT low, thereby opening the switch 61 in FIG. 1, and cutting off power to the microprocessor itself.

However, power to the microprocessor is not terminated immediately. Capacitor C2 in FIG. 1 maintains a charge, which powers the microprocessor for a few seconds, after switch 61 opens and disconnects the microprocessor from its power source, LINE(+). While receiving power from capacitor C2, the microprocessor is programmed so that, during the 1.5-second interval beginning with the opening of switch 61, the user cannot initiate another call by actuating switch 9.

This operation temporarily prevents the user from placing another call immediately after placing the telephone "on-hook." One reason is to prevent generation of short on-hook/off-hook transitions, which may be misinterpreted by some telephone switching systems. Under the invention, the microprocessor is programmed to maintain the telephone on-hook during the 1.5 second interval, and is powered by capacitor C2 at this time.

Figure 4:
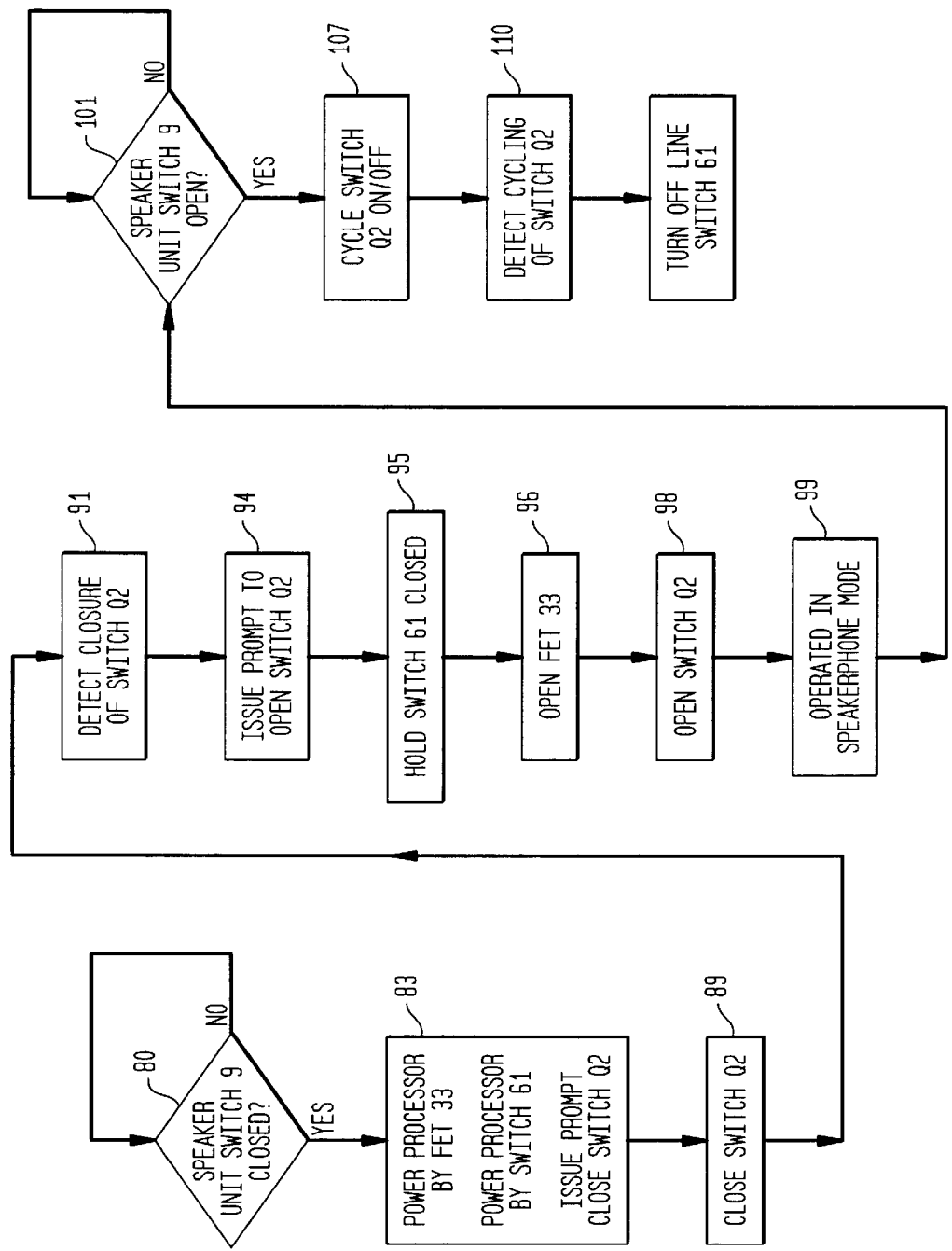
FIG. 4 is a flow chart illustrating logic followed by one form of the invention.

FIG. 4 is a flow chart of logic executed by one form of the invention. In block 80, inquiry is made as to whether user-switch 9 in FIG. 1 is closed. If not, the NO loop in FIG. 4 is taken from block 80. If switch 9 closes, indicating that the telephone should go off-hook, the logic proceeds to block 83, wherein three events occur. The first is that power is delivered to the microprocessor, and other components, by the closure of FET 33 in FIG. 1.

The second is that switch 61 is closed, by the closure of FET 33.

The third is that a prompt is issued, requesting closure of the keypad switch Q2. One form of this prompt is the LOW-HIGH transition on line 46 in FIG. 1.

Next, the logic reaches block 89 in FIG. 4, wherein the keypad switch Q2 actually closes. The microprocessor then detects the closure of keypad switch Q2, in block 91 in FIG. 4. This closure acts as a request for entering speakerphone mode of operation. When the closure is detected, the microprocessor issues a prompt for opening the keypad switch Q2, in block 94.

One prompt of the type issued in block 94 is the LOW-HIGH transition on the SPKOUT line in FIG. 2. In response to the prompt, as indicated by block 98 in FIG. 4, the keypad switch Q2 opens, as in FIG. 2C. In addition, the microprocessor orders the appropriate equipment into operation, for speakerphone operation, as indicated in block 99.

In block 95, switch 61 is kept ON, by the control signal SPKOUT in FIG. 1, and supplies power to the microprocessor. The microprocessor further generates a signal 42, to turn FET 33 OFF, as in block 96. This turn-off removes one control signal from line switch 61, but switch 61 is kept ON by the other control signal SPKOUT, as stated above.

The telephone operates in speakerphone mode until the user opens the user-switch 9 in FIG. 1. Block 101 in FIG. 4 indicates the inquiry made by the microprocessor at this time. If the opening is detected, as by the HIGH-LOW transition on line 46 in FIG. 1, caused by termination of current through LED 25, then keypad switch Q2 in FIG. 2 is cycled ON-OFF one time, as indicated by block 107, in the manner shown by FIGS. 2D and 2E. This cycling is detected by the microprocessor in block 110 in FIG. 4, which causes line switch 61 to turn OFF, thus removing power from the telephone set.

An invention has been described wherein an external speaker unit issues an actuation signal to a telephone, as by closing switch 9 in FIG. 1. The telephone is of the line-powered type, and is presently drawing no power from the line. In response to the actuation signal, the invention connects the electronic circuitry of the telephone to a power-carrying telephone line. In addition, the invention issues a keypad signal indicating that speakerphone operation of the telephone is requested.

A microprocessor, which has become activated by the power delivery, looks for the speakerphone request signal. When it detects the speakerphone request signal, in the form of closure of keypad switch Q2, it orders the appropriate apparatus into speakerphone operation, which, in turn, removes the keypad signal.

Later, when the external speaker unit issues a termination signal, as by opening switch 9 in FIG. 1, indicating termination of the telephone conversation, the invention briefly cycles the speakerphone request signal, by cycling keypad switch Q2. The microprocessor detects the cycling, and terminates speakerphone operation.

Definitional Matters

The following definitions apply to the terms indicated. Other definitions may apply. "Speakerphone mode" refers to a mode of operation wherein a telephone user can speak to, and hear, a party using another telephone set, but without the user's employment of a handset. The functions of the microphone and speaker of the handset are assumed by a speakerphone unit, which generally includes a loudspeaker and a microphone. Speakerphone operation is commonly used when multiple parties, seated about a conference table, wish to use a single telephone. "On-hook/off-hook" transition refers to the removal of a handset from its cradle (or "hook"). Prior to the removal, the handset was "on-hook." After the removal, the handset is "off-hook." Circuitry within the telephone detects the transition, and applies a signal to the telephone line, which is detected by a switching office operated by the telephone utility company.

Significant Features

1. The telephone 3 in FIG. 1 is powered by LINE(+) and LINE(−). It does not contain storage batteries, nor is it powered by household wall current.

The remote unit 6 is powered by household wall current, represented by power supply 12, but not by storage batteries, nor by LINE(+) nor LINE (−). The remote unit is powered independently of the telephone 3, and neither supplies power to the other (except to the extent that remote unit 6 supplies power to photodiodes 18 and 25). But, regarding the latter, the components 25 and 29, containing the photodiodes, are able to provide 1,000-volt isolation between the remote unit 6 and the telephone 3. That is, if the negative terminal of power supply 12 within the remote unit 6 were at a potential 1,000 volts higher than, say, LINE(−), the remote unit 6 would remain functional.

Stated a different way, the components 25 and 29 are able to withstand a 1,000-volt difference between line 46 and the line connecting diodes 18 and 25. Components 25 and 29 providing such isolation are commercially available.

Stated another different way, the remote unit 6 is optically isolated from the telephone 3. There is no common ground [LINE(+) and LINE(−) are not connected to the electrical wires which power the power supply 12], and there is no common current path shared by remote unit 6 and telephone 3.

More generally, any component within remote unit 6, as well as the housing (not shown) encasing the remote unit 6, can reside at a potential which is 1,000 volts different (positive or negative) from the potential of any component in electrical connection with the circuitry of the telephone 3, from which the housing is normally isolated. Diodes 18 and 25 are not in "electrical connection" with the telephone circuitry. They are "optically" connected.

2. In one test, transistor Q2 in FIG. 1 was replaced by a mechanical momentary-contact switch, which a user would press in order to initiate a conference call. (This switch can be located at the remote unit 6 in FIG. 1.) However, it was found that some users would press the switch so fast that the microprocessor 59 could not detect the switch press.

That is, the microprocessor 59 only looks for the switch closure during certain times. At other times, the microprocessor is occupied with other tasks. These users would execute a complete open-and-close cycle of the switch, in calling for a conference call, while the microprocessor was occupied with the other tasks. The microprocessor would miss the switch closure.

In attempting to solve this problem, addition of a latching relay to the mechanical switch was considered. The latching relay would close when the switch closed, and remain closed until a signal ordered it to open. The microprocessor would detect the closure of the latching relay, take appropriate action, and order the latching relay to open.

However, latching relays were found to require more current than LINE(+) and LINE(−) could supply. One class of latching relays consumed between 20 milliamps and 90 milliamps. Another class consumed between about 30 and 60 milliamps. All of these current consumptions were too high.

In another attempt to solve the microprocessor's problem of missing fast switch presses, a CMOS flip-flop was considered. The CMOS flip-flop would consume a sufficiently small current, but another problem arose. When the telephone powered up (which occurs every time a call is to be made), the flip-flop entered an indeterminate state, perhaps due to its transit through a metastable state. That is, the flip-flop, without any presses of the mechanical switch, would randomly indicate either that the switch was closed, or open. Such behavior was unacceptable.

The present invention solves the preceding problems. When switch 9 in FIG. 1 is closed, transistor Q2 is held closed until the microprocessor 59 recognizes the closure, and then Q2 is opened.

Numerous substitutions and modifications can be undertaken without departing from the true spirit and scope of the invention. What is desired to be secured by Letters Patent is the invention as defined in the following claims.

We claim:

1. In a line-powered telephone which includes a microprocessor, an improvement comprising:
    a) a switch, located remote from the telephone;
    b) means for detecting actuation of the switch and, in response,
        i) delivering power to the telephone from a telephone line; and
        ii) issuing a keypad signal, requesting initiation of speakerphone mode of operation, on a signal line accessible to the microprocessor.

2. A telephone according to claim 1, in which the switch is located in a housing containing a speaker, used in speakerphone operation.

3. A telephone according to claim 2, in which the housing, and all components therein, can withstand a 1,000-volt potential difference with respect to any component electrically connected with the telephone.

4. Apparatus according to claim 2, in which the switch is optically isolated from the telephone.

5. A telephone according to claim 1, and further comprising:
    c) means for detecting de-actuation of the switch and, in response, issuing said keypad signal a second time to thereby terminate speakerphone operation.

6. A line-powered telecommunication instrument, comprising:
    a) a microprocessor;
    b) speakerphone circuitry for operating the instrument in a speakerphone mode; and
    c) suppression circuitry for preventing on-hook/off-hook transition signals from reaching a telephone line, for a predetermined period, after speakerphone mode of operation terminates.

7. In a line-powered telephone which includes a microprocessor, an improvement comprising:
    a) a switch, located remote from the telephone;
    b) a detector for detecting actuation of the switch and, in response,
        i) delivering power to the telephone from a telephone line; and
        ii) issuing a keypad signal, requesting initiation of speakerphone mode of operation, on a signal line accessible to the microprocessor.

* * * * *